United States Patent [19]
Kincaid, Jr.

[11] 3,937,292
[45] Feb. 10, 1976

[54] DIESEL-ELECTRIC WHEEL TRACTOR WITH STEERABLE TRUCKS

[76] Inventor: Elmo Kincaid, Jr., 1660 Ashley Drive, Clarkston, Wash. 99403

[22] Filed: May 2, 1974

[21] Appl. No.: 466,211

[52] U.S. Cl. .................. 180/45; 180/44 E; 180/50; 180/51; 180/65 R; 180/79.2 B; 280/81 R; 280/423 R
[51] Int. Cl.² ........................................ B60K 17/30
[58] Field of Search ......... 180/49, 50, 51, 52, 65 R, 180/79.2 B, 45; 280/81 R, 109, 110, 423 R

[56] References Cited
UNITED STATES PATENTS

| | | | |
|---|---|---|---|
| 365,174 | 6/1887 | Engel | 280/110 |
| 1,048,770 | 12/1912 | Walker | 180/50 |
| 2,683,496 | 7/1954 | Prost | 180/50 |
| 2,966,223 | 12/1960 | Gleasman | 180/50 X |
| 3,107,304 | 10/1963 | Fagel | 180/65 R X |
| 3,454,123 | 7/1969 | Lewis | 180/50 X |
| 3,604,723 | 9/1971 | Daily | 280/91 |
| 3,669,202 | 6/1972 | Andersen | 180/79.2 B X |
| 3,693,741 | 9/1972 | Scheuerle | 180/50 |
| 3,797,862 | 3/1974 | Letterman | 280/423 R X |
| 3,826,516 | 7/1974 | Weber | 280/423 R X |

*Primary Examiner*—M. H. Wood, Jr.
*Assistant Examiner*—John P. Silverstrim
*Attorney, Agent, or Firm*—Charles D. McClung

[57] ABSTRACT

A diesel-electric tractor having individually powered wheels carried by two independently mounted steerable trucks. The forward truck is ball and socket mounted to the principal tractor frame to allow pivotal motion in vertical and horizontal planes; the rear truck is pin mounted to allow rotational movement in a horizontal plan. Truck frame mounting by pneumatic anti-shock devices allows operation of the tractor at highway speeds.

1 Claim, 6 Drawing Figures

DIESEL-ELECTRIC WHEEL TRACTOR WITH STEERABLE TRUCKS

BACKGROUND OF INVENTION

RELATED APPLICATIONS

There are no applications related hereto now filed in this or any foreign country.

FIELD OF INVENTION

My invention relates generally to four wheel drive tractors and more particularly to such tractors having front and rear steerable trucks carrying individually powered wheel groups.

DESCRIPTION OF PRIOR ART

Most of the component elements shown in my invention are known per se, however, none of the known art teaches the use of these elements in the combination that I show nor are many of these elements known in the tractor arts. The use of a diesel power plant to run an electric generator which powers multiple electric motors, each driving individual vehicle wheels, is known, in the heavy equipment and automotive arts. This technique has not heretofore been applied to the tractor art. It provides inherent advantage in traction by allowing differential use of only such power as is required or may be effectively used by a particular wheel. The combination of a fuel powered motor with electric drives allows relatively unrestricted and more effective weight distribution to further increase potential traction and provide greater operating efficiency and convenience. These features generally allow wheel-type tractor to be used in situations normally heretofore requiring a track-type vehicle.

Present day multiple wheel drive tractors transmit power from the engine to the several individual wheels by mechanical linkages of some sort normally including a transmission and differential. Normal large tractors have some ten to fifteen mechanically determined discrete speed ranges, many of which are narrowly grouped in the three to six mile per hour range for most power functions. The total number of available speeds in these tractors is necessarily limited by transmission size and complexity and the absolute range somewhat by mechanical design. Individual electric wheel driving motors on the other hand can, by utilizing an infinitely variable resistance control network and possibly plural switchable transformers, give a speed range varying from a slow pulling application to normal transient speeds on highways.

A primary feature of my invention lies in the steering and drive elements I use and in the mounting of these elements to the main vehicle frame. Known wheel tractors have provided individual steering for front and back set of wheels, either with both wheels of a set coordinated to increase the turning radius or with both parallel to allow crabbing. These tractors that have provided individual steering of both wheel sets have done so, however, with normal tie rod and knuckle steering as known in the automotive arts. A steering assembly of this type is costly to originally fabricate and requires continuing maintenance especially to maintain alignment; moreover, these conventional steering devices are subject to breakage under severe environmental conditions found in normal tractor operation, and some elements wear normally and require frequent replacement of relatively costly parts. My steerable truck provides plural platform-like trucks upon which are mounted the wheel drive motors, axles and wheel assemblies. The trucks are movably mounted to the tractor frame to allow vehicle steerage by turning the truck relative the main frame by hydraulic actuators at the medial ends of both trucks.

All of these features distinguish my invention from the known tractor art.

SUMMARY OF INVENTION

My invention provides a fuel energized electric drive tractor having individually powered wheels mounted on steerable front and rear trucks pivotably joined to the principal tractor frame through a unique resilient linkage.

I provide a body and frame assembly embodying an enclosed cab mounted upon a relatively lightweight rectangular box-like framework. Forward of the cab the framework carries a power plant and electric generator and rearward of the cab there is space for fuel storage tanks and ballast. Both power plant and generator are of a low profile type for operator visability. Individual variable speed electric motors are positioned adjacent each of the vehicle's driven wheels, with appropriate mechanical interconnection. An engine speed governor and electric control circuitry provide regulation of electrical output dependent upon vehicle load. The drive eliminates the need for transmission and differentials.

For suspension and steering I provide longitudinally opposed trucks each carrying groups of at least two supportative wheels, at least two laterally opposed wheels of each group being driven by the electric motors. The trucks provide a rigid peripheral framework with internal mounting of driving motors and wheel driving linkage. Axles are journaled in the frame elements by appropriate thrust bearings to extend laterally outward from the frame to carry the wheels. In the configuration illustrated the trucks are each slightly shorter than one-half of the total tractor length. The medial adjacent portions of each truck narrows to provide nearly pointed front portions. Hydraulic cylinders extend from this front portion of each truck to the tractor framework to provide steerage. Each truck provides a cross beam slightly forward of the center of its frame with a medial bushing to allow pivotable joinder of the trucks to the tractor framework. Connecting pins depend from the principal frame through the truck bushing to provide the rotatable interconnection. The upper portion of one connecting pin is rigidly mounted to the frame above the rear truck and the other movably mounted by a ball and socket connection above the front truck. A resilient torus-like pneumatic shock absorber with annular top and bottom bearing surface acts as an interface between the frame and truck for vertical cushioning.

The cab may be formed with appropriate strength to support a normal fifth-wheel for trailer locomotion on a highway if desired.

In providing such a device it is:

A principal object of my invention to create a fuel powered electric driven tractor for having individually powered drive wheels carried in paired opposed groups by longitudinally opposed steerable tracks for improved traction and stability.

A further object of my invention to provide at least one of these trucks with three dimensional pivotable joinder to allow it to tractionally conform to terrain while maintaining the principal tractor frame level.

A further object of my invention to provide such a tractor wherein truck suspension is by a novel resilient pneumatic shock absorber to allow smooth high speed highway travel.

A still further object of my invention to provide such a tractor that is of new and novel design, of rugged and durable nature, of simple and economic manufacture and otherwise well adapted to the uses and purposes for which it is intended.

Other and further objects of my invention will appear from the following specifications and accompanying drawings which form a part hereof. In carrying out the objects of my invention, however, it is to be understood that its essential features are susceptible of change in design and structural arrangement, with only one preferred and practical embodiment being set forth in the accompanying drawings as required.

BRIEF DESCRIPTION OF DRAWINGS

In the accompanying drawings which form a part hereof and wherein like numbers of reference refer to similar parts throughout:

FIG. 6 is a schematic of the hydraulic steering system of my invention.

DESCRIPTION OF THE PREFERRED EMBODIMENT

Figure 1:
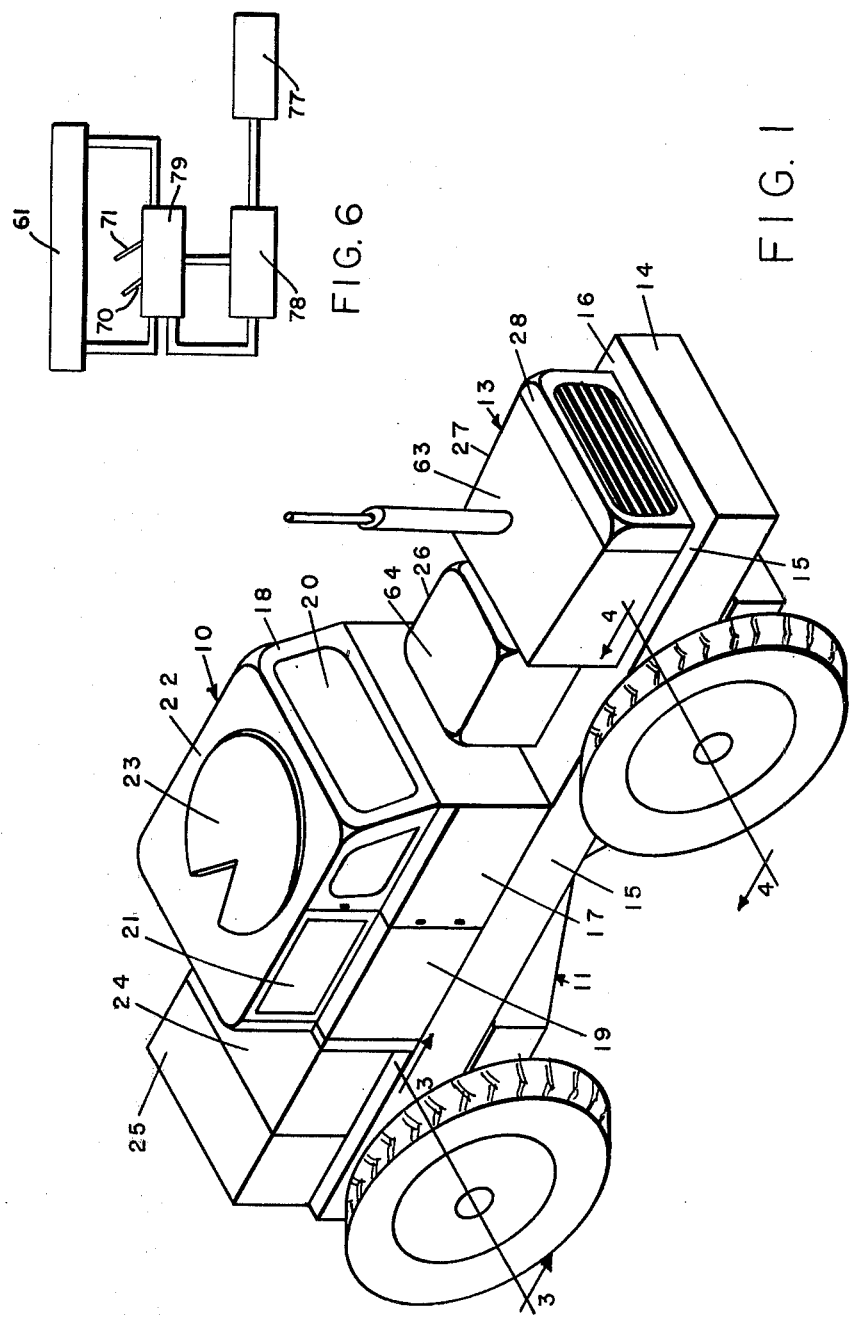
FIG. 1 is an isometric view of my invention showing its elements, their configuration and relationship.
Figure 2:
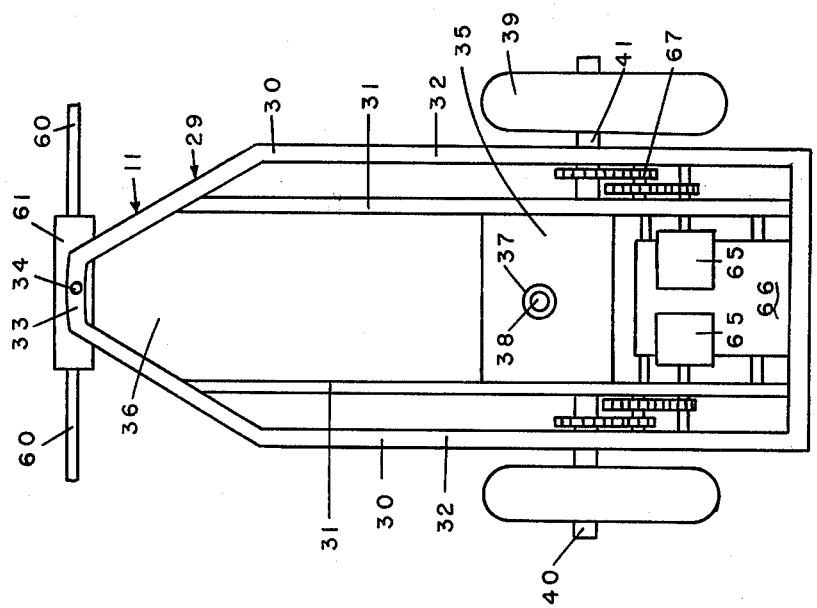
FIG. 2 is an orthographic top view of one of the truck members of my invention.

Referring now to the drawings in more detail and particularly to that of FIG. 1, it will there be seen that my invention generally comprises body member 10 pivotably supported on longitudinally opposed truck members 11 by suspension member 12 with interconnecting steering linkage, the whole being powered by propulsion member 13.

Body member 10 comprises an elongate rectangular framework 14 upon which the various body elements are mounted. The framework can be of a relatively lightweight construction and the specific techniques used for fabrication are immaterial. In this instance the frame provides a peripheral element of "I" beams with several interjoining crossbeams all covered with sheet metal 15. Mounted on the upper surface 16 of the framework in its medial portion 17 is the operator's cab 18 of a type well known in the tractor art. The cab shown contains side doors 19 for ingress and egress, front 20 and side 21 windows positioned generally above the adjacent external elements to allow unobstructed viewing and a generally sealed covering 22 so that internal environment can be isolated from ambient conditions when in operation, if so desired. Internally the cab contains the controls and amenities normal in the tractor arts. My particular cab differs somewhat from known tractor cabs in that it is heavily constructed to allow it to carry fifth-wheel 23 for trailer interconnection on its roof. This feature allows alternative use of the tractor, with an appropriately designated tongue adapter 76 as a prime mover to haul a trailer, especially as on a highway.

Immediately behind and adjacent the cab is fuel storage tank 24 carried on the upper surface of the framework. It may be of a type of fuel tank known in the prior art, but should have a relatively large capacity to allow a days work without refueling and of a low profile to aid operator visability. Immediately behind the fuel tank ballast 25 is provided, if necessary, to improve traction when operating in adverse conditions. The ballast is normally removable in some fashion for adjustment and in this instance consists of blocks of lead bolted to the frame. Forward of the cab are covered enclosures 26, 27, 28 for the generator, power plant and radiator respectively. These elements are dimensioned to enclose the respective equipment carried on the body frame and provide removable portions for access to allow servicing.

The specific body configuration utilized is not material to my invention and is meant to be merely illustrative and not exclusive. In general other tractor frame and body elements known in the prior art can be substituted or added without detracting from the essence of the invention as long as they do not integrally relate to or interfere with the suspension and steering members.

Truck members 11 provide elongate sub-frames 29, independent of body framework 14 formed with peripheral beam elements 30 interconnected by longitudinal internal beams 31 positioned parallel to peripheral side elements 32 at a spaced distance. The inward facing ends of the peripheral framework elements narrow to form inward frame ends 33 which provide means 34 for joinder to the hydraulic steering actuators. Suspension cross beam 35 of the same height as the frame elements, laterally spans void 36 between the inner beams and is structurally joined thereto. The crossbeam defines a medial cylindrical void 37 in which a communicating bushing-type bearing 38 is structurally retained. Laterally adjacent each frame side element, at least one wheel assembly 39 is irrotatably carried on a cylindrical axle 40. This axle extends through holes 41 in side beam frame element 32 and internal beam 31 and is journaled in bearings carried therein. Opposed cooperating thrust bearings 42 with associated keepers 43 are positioned on each axle immediately outwardly of the side elements and inwardly of the internal beam to maintain the axles in lateral position. These axles extend outwardly from the frames a sufficient distance to allow mounting thereon of one or more wheels as desired. Plural axles, either driven or undriven, may be used as desired, however, the configuration shown uses only the minimally required single set of axles per truck. Braking means 68 of a type known in the vehicle arts, in the instance shown disc brakes, are provided on at least one set of wheels and preferably with each driven axle.

Figure 3:
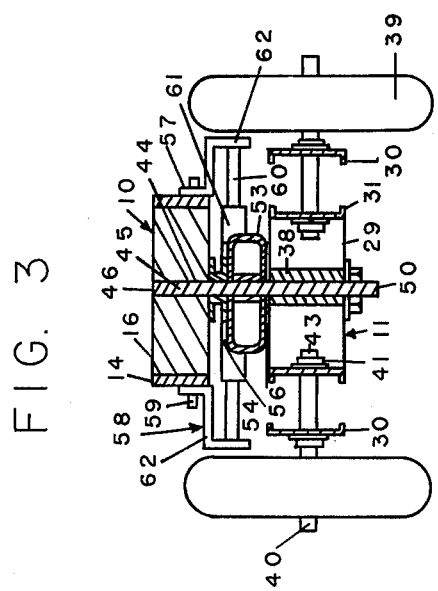
FIG. 3 is a vertical sectional view of the rearward truck shown in FIG. 2 taken on the line 3—3 thereon in the direction indicated by the arrows.
Figure 4:
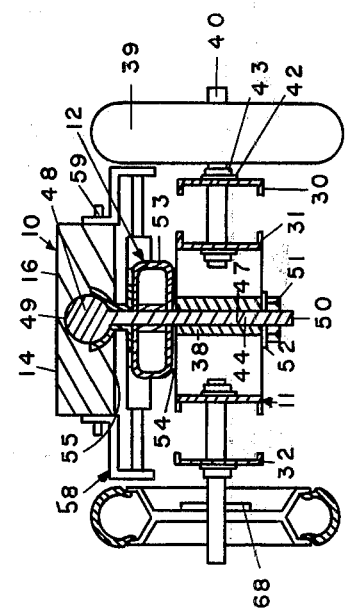
FIG. 4 is a vertical sectional view of the forward truck shown in FIG. 2 taken on the line 4—4 thereon in the direction indicated by the arrows.
Figure 5:
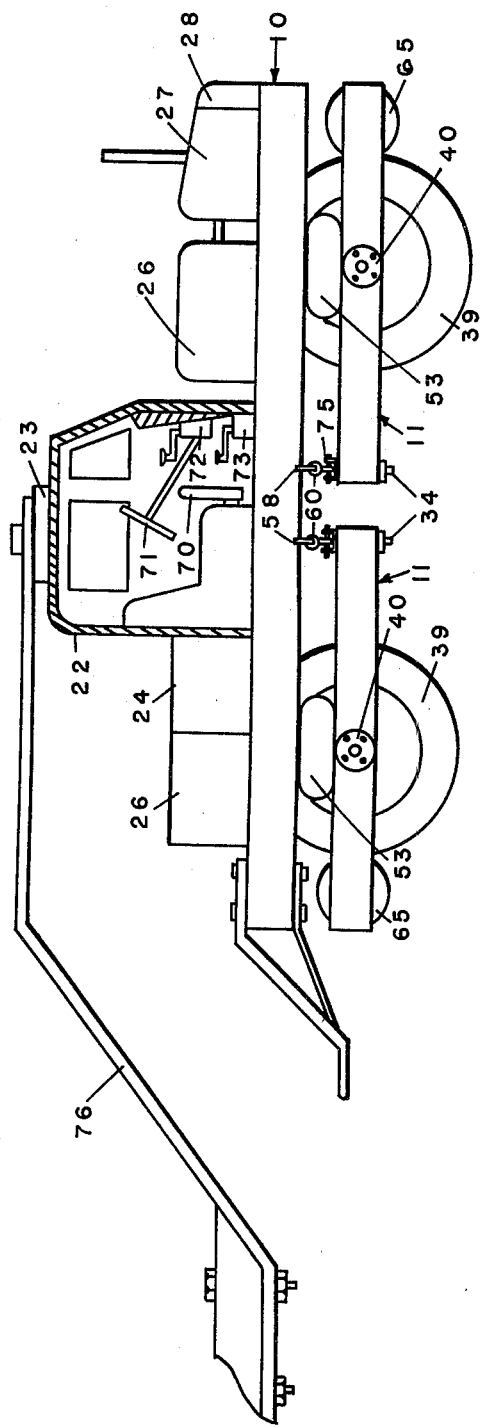
FIG. 5 is an orthographic side view of my invention with the cab and wheels partially removed.

Suspension member 12 provides elongate cylindrical suspension pins 44 depending downwardly from structural joinder with the tractor frame ends. Rear suspension pin 45, shown in FIGS. 3 and 5 is structurally attached to the frame as by welding in communicating hole 46 in the frame and is so positioned as to be above bearing 38 in the rear truck member. Forward suspension pin 47, shown in FIGS. 4 and 5 provides a similar elongate cylindrical pin with enlarged cylindrical upper portion 48 which pivotably communicates with socket 49 defined in tractor frame 10 above bearing 38 in the forward member. Both suspension pins pivotably communicate through bearings 38 carried by the trucks with the lower portion 50 of the pin extending therethrough. The lowermost portion of pins define threads which are engaged underneath bearings 38 by nuts 51 and washer-bearings 52 to maintain suspended adjacency of framework 10 and trucks 11. The suspension pins, in order to provide necessary structural joinder of the frame and suspension members, must be constructed of high strength material with sufficient cross-sectional area to withstand the heavy shear and bending loads inherent in this type of application. I prefer steering pins formed of a high strength steel alloy several inches in diameter to absorb this stress.

Pneumatic spring 53 defining a torus-like enclosure of a resilient rubber-like material faced on the top and bottom surfaces with annular metallic bearing plates 54 is positioned between lower surface 55 of frame 10 and upper surface 56 of truck 11 so that steering pin 47 passes through its center. Again the exact construction of this spring is not essential and those known in the prior art suffice for my application. It must, of course, be sturdy enough to support the required tractor weight.

Upper leg 57 of "Z" shaped mounting bracket 58 is pivotably attached by horizontal laterally extending hinge pins 59 to each side of principal frame 10 above forward end 33 of each truck 10.

Opposed arms 60 of double acting hydraulic cylinder 61 are rigidly joined to the lower leg 62 of each bracket 58 so that the hydraulic cylinder is suspended therebetween. The central portion of the cylinder is pivotably joined by a pin fastener 75 to connection means 34 on the inward facing ends of trucks 11.

Propulsion member 13 provides a flat, opposed cylinder diesel engine 63, in this preferred embodiment providing six cylinders with an output of approximately 150 horsepower. Particular details of the engine are not essential to my invention, however, it should be of a type designed for heavy duty tractor usage and of a low profile to allow an improved view ahead of the tractor by an operator seated in the cab. Immediately rearward of and operatively linked to the engine is electrical generating unit 64. The specific generating unit is of a type well known in the prior art and again its particular features are not critical so long as they are compatible with the particular engine powering it. The generator is coupled to the engine by direct drive elements (not shown). It is provided with associated control circuitry and switching elements known in diesel-electric arts and commercially available for these units to electrically couple it in controllable fashion with plural variable speed, electric motors 65 mounted on motor platform 66 suspended between internal beams at the front of the forward truck and at the rear of the rear truck. At least two motors are provided for each truck, with each motor individually powering its adjacent wheel assembly. Plural gear linkage 67, mounted between the truck peripheral frame side elements 32 and internal beams 31 transmit power to each driven axle to move its associated wheel. Each motor is individually controllable from the cab by control means heretofore known in control circuitry arts so that power can be supplied through all or any selected driven wheel unit.

The propulsion member also provides power to a cab controlled hydraulic system for operation of tractor steering and such hydraulicly powered ancillary devices heretofore known as may be desired. As shown in FIG. 6 steering is provided by hydraulic pump 77 supplying pressurized hydraulic fluid to reservoir 78 thence to control valve 79, located in the vehicle cab, for operation of hydraulic cylinder 61. Control valve 79 is a hand operated three-way valve as is common in the industry and bypasses the hydraulic fluid to the reservoir when in the null position and supplies hydraulic fluid to the desired end of the hydraulic cylinder when in either of the two operating positions.

It is to be noted that while my invention is particularly described in relation to larger type wheeled tractors, largely for farm use, it is not essentially limited in this respect. The features shown are equally applicable to other tractor-type vehicles operating under similar conditions of load and terrain.

Having thusly described the structure of my invention, its operation may be readily understood.

Firstly, a vehicle is constructed according to the foregoing specification and the known principals of the prior art. The engine of the tractor is started, preferably automatically by cab carried controls, and its speed appropriately regulated for the desired operation. The cab carried electrical controls are then established to transmit the generator created electric power to the desired wheel motors to move the vehicle. Preferably there is an individual speed-power control for each wheel and for convenience and ease of operation preferably all or any groups of such controls may be operated simultaneously. I prefer that the motor controls be interlinked to the motor speed control, as is common in the prior art, to avoid waste of fuel.

Steerage is accomplished with cab carried controls for the hydraulic system. The opposed cylinders of each steerage linkage are interconnected to act oppositely so that in effect the piston rod ends remain stationery with reference to the primary frame while the cylinder body moves. Since one cylinder body is attached to the forward end of rear truck and rear end of front truck, steerage of each truck is thusly accomplished. A control lever 70 is provided for rear steerage cylinder, a steering wheel 71 is provided for front truck. Current reversal switch 72 and isolation switch 73 allow idle or reverse operations.

From the foregoing description it is to be noted that each truck may be independently steered and each wheel individually powered. The electric powering system allows a great range of speed with continuous variability from the slowest draft speed to highway speeds. The suspension system is such as to allow the vehicle to operate at all speeds to thus materially increase its potential use particularly in highway applications. The variability of wheel drives and speeds coupled with the multiple truck steerage and movable suspensions is particularly beneficial in hillside farming operations to allow maneuvers not possible with known wheel tractors.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

Having thus described my invention, what I desire to protect by Letters Patent, and what I claim is:

1. A wheel type electric powered tractor comprising, in combination:

a principal frame having an operator's cab containing operational controls and supporting an engine powering an electric generator;

forward and rearward trucks articulatively supporting the principal frame, each truck having at least one set of paired opposed wheels irrotatably carried on individual axles journaled therein for support of the vehicle on a supporting surface;

steering means associated with each truck;

plural electric drive motors, powered by the electrical output of the electric generator, carried on the trucks one associated with each wheel on each truck through mechanical linkage to drive the associated wheel;

control means activated by the operational controls to operate the steering means;

wherein the articulative support of the principal frame on at least one truck comprises ball and socket joinder means to allow relative motion between the principal frame and the truck in two mutually perpendicular planes;

torus-like air cushion springs with metallic bearing plates operatively separating the trucks and principal frame about the ball and socket joinder means.

* * * * *